(12) United States Patent
Peng et al.

(10) Patent No.: US 11,888,369 B2
(45) Date of Patent: Jan. 30, 2024

(54) MAGNETIC POLE MODULE AND ROTOR FOR PERMANENT MAGNET GENERATOR

(71) Applicant: BEIJING GOLDWIND SCIENCE & CREATION WINDPOWER EQUIPMENT CO., LTD., Beijing (CN)

(72) Inventors: Liang Peng, Beijing (CN); Yanhui Li, Beijing (CN); Bin Lan, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 681 days.

(21) Appl. No.: 17/042,704

(22) PCT Filed: Mar. 10, 2020

(86) PCT No.: PCT/CN2020/078575
§ 371 (c)(1),
(2) Date: Sep. 28, 2020

(87) PCT Pub. No.: WO2020/244269
PCT Pub. Date: Dec. 10, 2020

(65) Prior Publication Data
US 2023/0112562 A1    Apr. 13, 2023

(30) Foreign Application Priority Data

Jun. 6, 2019    (CN) .......................... 201910489956.5

(51) Int. Cl.
*H02K 1/27*    (2022.01)
*H02K 29/03*   (2006.01)
(Continued)

(52) U.S. Cl.
CPC ........... *H02K 29/03* (2013.01); *H02K 1/2791* (2022.01); *H02K 1/30* (2013.01); *H02K 2201/06* (2013.01);
(Continued)

(58) Field of Classification Search
CPC ........ H02K 29/03; H02K 1/2791; H02K 1/30; H02K 2201/06; H02K 2213/03;
(Continued)

(56) References Cited

U.S. PATENT DOCUMENTS

2010/0277027 A1* 11/2010 Kaiser .................... H02K 1/276
                                                        310/156.47
2011/0175480 A1    7/2011 Booth
(Continued)

FOREIGN PATENT DOCUMENTS

CN    101924407 A    12/2010
CN    103312067 A     9/2013
(Continued)

OTHER PUBLICATIONS

The First Australian Office Action dated Apr. 23, 2021: Appln. No. 2020239547.
(Continued)

*Primary Examiner* — Thomas Truong (57) ABSTRACT

A magnetic pole module and a rotor for a permanent magnet generator are provided. The magnetic pole module includes a base plate having a first surface and a second surface arranged opposite to each other, the base plate has a first center line extending in the first direction and a second (Continued)

center line extending in the second direction, the first direction is intersected with the second direction, the first center line is parallel to the central axis of the permanent magnet generator; at least one pair of magnetic steel components is fixed on the base plate, and each pair of magnetic steel components is symmetrically arranged on the first surface with respect to the second center line, each magnetic steel component includes multiple magnetic steels arranged side by side along a side of the first direction from the second center line and arranged at a predetermined angle in the second direction.

16 Claims, 6 Drawing Sheets

(51) Int. Cl.
 *H02K 1/2791* (2022.01)
 *H02K 1/30* (2006.01)
(52) U.S. Cl.
 CPC ..... *H02K 2213/03* (2013.01); *H02K 2213/12* (2013.01)
(58) Field of Classification Search
 CPC ........ H02K 2213/12; H02K 1/28; H02K 1/27; H02K 1/06; Y02E 10/72
 See application file for complete search history.

(56) References Cited

U.S. PATENT DOCUMENTS

| | | | |
|---|---|---|---|
| 2013/0169099 A1* | 7/2013 | Saban | H02K 1/279 310/156.12 |
| 2014/0009024 A1 | 1/2014 | Heim | |
| 2015/0015107 A1 | 1/2015 | Werke | |
| 2020/0083765 A1* | 3/2020 | Kurronen | H02K 1/274 |
| 2021/0067019 A1 | 3/2021 | Sun et al. | |

FOREIGN PATENT DOCUMENTS

| | | |
|---|---|---|
| CN | 103545997 A | 1/2014 |
| CN | 105048677 A | 11/2015 |
| CN | 105226859 A | 1/2016 |
| CN | 108696017 A | 10/2018 |
| CN | 108777521 A | 11/2018 |
| JP | 10210718 A | 8/1998 |
| JP | 2001251838 A | 9/2001 |

OTHER PUBLICATIONS

Extended European Search Report dated May 7, 2021; Appln. No. 20767709.7.
International Search Report and Written Opinon dated Jun. 8, 2020; PCT/CN2020/078575.
The First Chinese Office Action dated Feb. 7, 2022; Appln. No. 201910489956.5

* cited by examiner

MAGNETIC POLE MODULE AND ROTOR FOR PERMANENT MAGNET GENERATOR

CROSS-REFERENCE TO RELATED APPLICATIONS

The present application is a National Phase entry of PCT Application No. PCT/CN2020/078575, filed on Mar. 10, 2020, which claims the priority to Chinese Patent Application No. 201910489956.5, titled "INTEGRAL MAGNETIC POLE MODULE AND ROTOR FOR PERMANENT MAGNET GENERATOR", filed on Jun. 6, 2019, which are incorporated herein by reference their entities.

FIELD

The present application relates to the technical field of wind power generation, and in particular to a magnetic pole module and a rotor for a permanent magnet generator.

BACKGROUND

Cogging torque is an inherent phenomenon of a permanent magnet generator, and is the magnetic reluctance torque produced by the interaction between the permanent magnet of a rotor and the cogging of a stator core when the winding of the permanent magnet generator is not energized. In the actual operation process, the cogging torque may not affect the average torque of the permanent magnet generator, but may cause torque fluctuations, resulting in the noise, the vibration and the like produced by the permanent magnet generator, which may affect the stability of the generator operation.

In order to reduce the cogging torque, the rotor with an inclined pole arrangement is usually adopted, but the rotor with the inclined pole arrangement may, in addition to generate the tangential excitation to drive the generator to rotate, further generate the additional axial excitation, which may cause the abnormal vibration of the generator.

SUMMARY

An object of the present application is to provide a magnetic pole module and a rotor for a permanent magnet generator. The magnetic pole module may effectively restrain the axial excitation while reducing the cogging torque of the permanent magnet generator.

On one hand, a magnetic pole module is further provided according to an embodiment of the present application. The magnetic pole module is installed on a rotor support of a permanent magnet generator and includes a base plate having a first surface and a second surface which are arranged opposite to each other along its own thickness direction. The base plate has a first center line extending in a first direction and a second center line extending in a second direction, and the first direction is intersected with the second direction, the first center line is parallel to a central axis of the permanent magnet generator. The magnetic pole module further includes at least one pair of magnetic steel components is fixed on the base plate, and each pair of magnetic steel components is symmetrically distributed on the first surface relative to the second center line, each magnetic steel component includes a plurality of magnetic steels arranged side by side in a side of the first direction from the second center line and at a predetermined angle in the second direction.

On the other hand, a rotor for a permanent magnet generator is further provided according to the embodiment of the present application, which includes a rotor support having a mounting surface; a plurality of fixing members distributed and spaced apart on the mounting surface along a circumferential direction of the rotor support, a mounting rail is formed between every two adjacent fixing members; a plurality of any one of magnetic pole modules as described above, the magnetic pole module is installed on the mounting rail in the first direction.

According to the magnetic pole module and the rotor for the permanent magnet generator provided by the embodiment of the present application, a plurality of magnetic steels of the magnetic pole module are symmetrically arranged with respect to the second center line of the base plate, and arranged side by side in the first direction from the second center line and successively staggered in the same direction in the second direction, so that the rotor forms a double inclined pole arranged inversely in the axial direction of the generator, which may effectively restrain the axial excitation while reducing the cogging torque of the generator, thus improving the stability and reliability of the permanent magnet generator.

BRIEF DESCRIPTION OF THE DRAWINGS

The present application may be better understood from the following description of the specific embodiments of the present application in conjunction with the drawings, wherein, other features, objects and advantages of the present application will become more apparent by reading the following detailed description of the non-restrictive embodiments with reference to the drawings, where the same or similar reference numerals represent the same or similar features.

Reference numerals in the figures:

| | |
|---|---|
| 1 | magnetic pole module, |
| 2 | rotor support, |
| 2a | mounting surface, |
| 3 | fixing member, |
| 3a | mounting rail, |
| 32 | insertion portion, |
| 33 | connection hole, |
| 31 | crimping portion, |
| 171 | first groove, |
| 172 | second groove, |
| 10 | base plate, |
| 101 | first base plate, |
| 102 | second base plate, |
| a | first surface, |
| b | second surface, |
| c | first side wall, |
| d | second side wall, |
| L1 | first line segment, |
| L2 | second line segment, |
| L3 | third line segment, |
| 11 | first tangent plane, |
| 12 | first bottom wall, |
| 121 | first half bottom wall, |
| 122 | second half bottom wall, |
| 13 | second tangent plane, |
| 14 | second bottom wall, |
| 141 | third half bottom wall, |
| 142 | fourth half bottom wall, |
| 15 | first connection portion, |
| 15a | first pressure-bearing surface, |
| 15b | second pressure-bearing surface, |
| 16 | second connection portion, |
| 161 | first groove, |
| 162 | second groove, |
| 17 | third tangent plane, |
| 18 | third bottom wall, |
| X | first direction, |
| Y | second direction, |
| C1 | first center line, |
| C2 | second center line, |
| θ1 | first included angle, |
| θ2 | second included angle, |
| θ3 | third included angle, |
| D1 | central axis of rotor, |
| 20 | magnetic steel component, |
| 21 | magnetic steel, |
| 211 | first side, |
| 211a | first endpoint, |
| 211b | second endpoint, |
| 211c | third endpoint, |
| 211d | fourth endpoint, |
| 212 | second side, |
| O | symmetrical center point of magnetic steel 21. |

DETAILED DESCRIPTION OF THE EMBODIMENTS

The features and exemplary embodiments of various aspects of the present application are described in detail below. In the following detailed description, a number of specific details are disclosed in order to fully understand the present application. However, for those skilled in the art, apparently, the present application may be implemented without some of these specific details. The following description of the embodiments is only intended to provide a better understanding for the present application by illustrating embodiments of the present application. The present application is by no means limited to any specific configuration or algorithm provided below, but covers any modification, substitution and improvement of elements, components and algorithms without departing from the spirit of the present application. In the drawings and the following description, well-known structures and techniques are not shown in order to avoid unnecessarily obscuring the present application.

For a better understanding of the present application, a magnetic pole module, a rotor and a generator provided according to the embodiment of the present application are described hereinafter in detail in conjunction with FIGS. 1 to 12.

Figure 1:
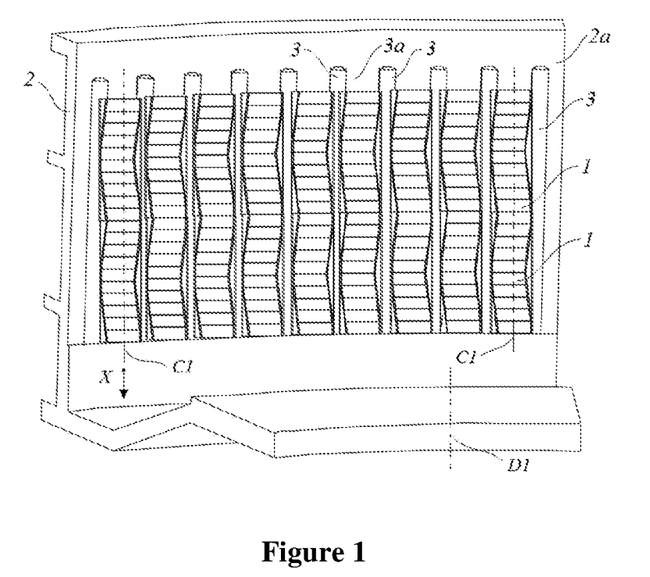
FIG. 1 is a schematic view showing a local structure of a rotor taken by a permanent magnet generator provided according to the embodiment of the present application along a direction perpendicular to an axial direction of the rotor.

Referring to FIG. 1, a rotor for a permanent magnet generator is provided according to the embodiment of the present application, and the permanent magnet generator includes a stator and a rotor coaxially arranged. The stator includes a stator core and a stator winding. The rotor includes a rotor support 2, multiple fixing members 3 fixed on a mounting surface 2a of the rotor support 2 and multiple magnetic pole modules 1.

The permanent magnet generator may be an internal-stator and external-rotor structure, that is, the rotor is arranged along an outer periphery of the stator, and the mounting surface 2a of the rotor support 2 is an inner peripheral surface of the rotor support 2. The permanent magnet generator may also be an internal-rotor and external-stator structure, that is, the stator is arranged along the outer periphery of the rotor, and the mounting surface 2a of the rotor support 2 is an outer peripheral surface of the rotor support 2, so that the magnetic pole module 1, the stator core and the stator winding are arranged with respect to each other.

The multiple fixing members 3 are arranged spaced apart on the mounting surface 2a along a circumferential direction of the rotor support 2, and a mounting rail 3a is formed between every two adjacent fixing members 3.

The magnetic pole module 1 is installed on the mounting rail 3a in a first direction X, and the first direction X is parallel to a central axis D1 of the permanent magnet generator.

Multiple columns of magnetic pole modules 1 are arranged on the mounting surface 2a of the rotor support 2 along the circumferential direction of the rotor support 2, and each magnetic pole module 1 in the multiple columns of magnetic pole modules 1 is aligned with each other in the circumferential direction of the rotor support 2. The multiple magnetic pole modules 1 are arranged on the mounting surface 2a of the rotor support 2 in one or more rows along a direction parallel to the axial direction of the central axis D1 of the generator rotor, and each magnetic pole module 1 in rows of magnetic pole modules 1 is aligned with each other along the direction parallel to the axial direction of the permanent magnet generator.

The specific structure of the magnetic pole module 1 provided by the embodiment of the present application will be described in detail below in combination with the accompanying drawings. For ease of description, an internal-stator and external-rotor generator structure is taken as an example for illustration hereinafter.

Figure 2:
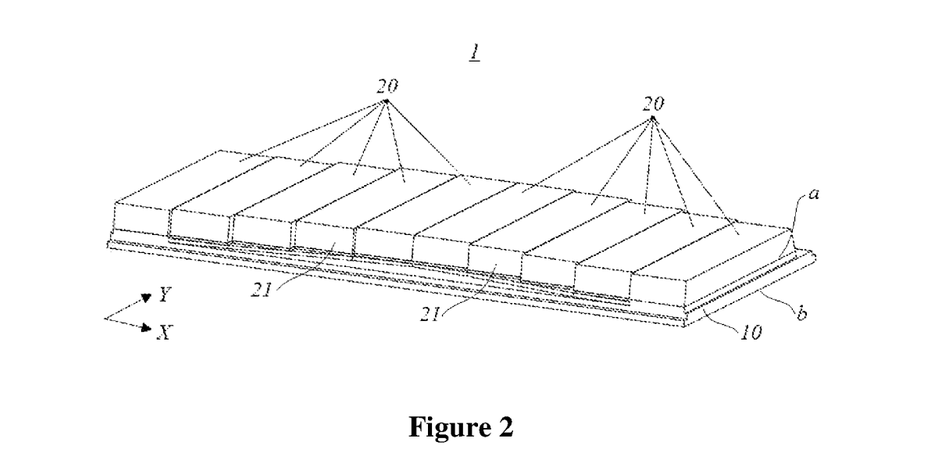
FIG. 2 is a schematic perspective view showing a structure of a magnetic pole module according to the embodiment of the present application.
Figure 3:
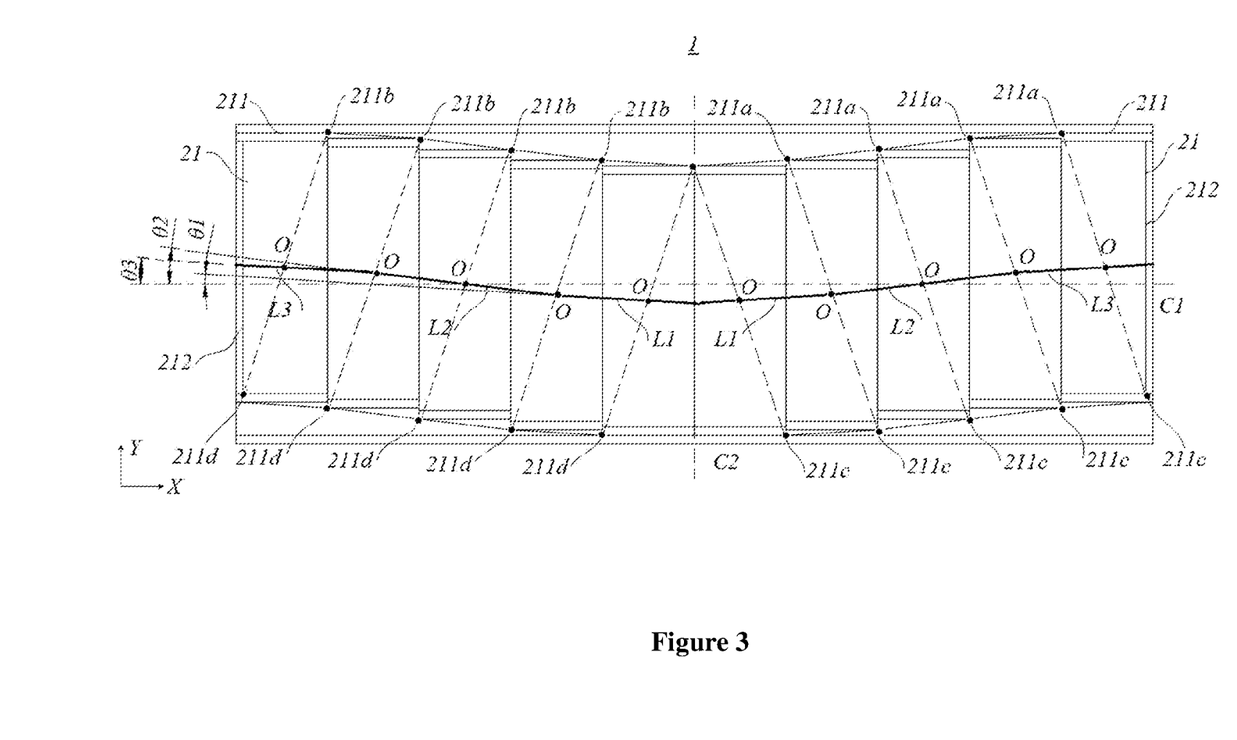
FIG. 3 is a schematic top view showing the structure of the magnetic pole module shown in FIG. 2.

Referring to FIGS. 2 and 3, a magnetic pole module 1 is provided according to the embodiment of the present application, which is installed on the rotor support of the permanent magnet generator, and includes a base plate 10 and at least one pair of magnetic steel components 20 arranged on the base plate 10.

The base plate 10 has a first surface a and a second surface b arranged opposite to each other along its own thickness direction. The first surface a is a plane, and the second surface b is arranged close to the mounting surface 2a of the rotor support 2, which may be a plane or an arc surface fitted with the mounting surface 2a. The base plate 10 has a first center line C1 extending in the first direction X and a second center line C2 extending in the second direction Y, the first direction X is intersected with the second direction Y, and the first center line C1 is parallel to the center axis D1 of the permanent magnet generator. In an embodiment, a longitudinal sectional plane of the base plate 10 in the first direction X is rectangular, the first direction X is parallel to the axial direction of the permanent magnet generator, and the second direction Y is parallel to a tangential direction of the circumferential direction of the permanent magnet generator.

At least one pair of magnetic steel components 20 is fixed on the base plate 10, each pair of magnetic steel components 20 is symmetrically distributed on the first surface a relative to the second center line C2, and each magnetic steel component 20 includes multiple magnetic steels 21 arranged side by side in a side of the first direction X from the second center line C2 and arranged at a predetermined angle in the second direction Y.

In an embodiment, at least one pair of magnetic steel components 20 is arranged on the base plate 10 in the first direction X, that is, along a direction of the central axis D1 of a generator to form the magnetic pole module 1, and the multiple magnetic pole modules 1 form a column of integral magnetic pole modules in the first direction X. In an embodiment, multiple pairs of magnetic steel components 20 may be arranged on the base plate 10 in the first direction X to form a column of integral magnetic pole modules.

Multiple magnetic steels 21 of at least one pair of magnetic steel components 20 are arranged on the base plate 10 in the above manner to form at least one "V" shape, so that the multiple magnetic steels 21 of each pair of magnetic steel components 20 form a double inclined pole arranged inversely along the axial direction, so as to reduce the cogging torque. At the same time, the multiple magnetic steels 21 of each pair of magnetic steel components 20 may, in addition to generate the tangential excitation that drives the generator to rotate, further generate the additional axial excitation in an opposite direction, which just offsets each other along the axial direction of the generator rotor, thus eliminating the adverse effect of the additional axial excitation caused by the rotor inclined pole arrangement.

According to the magnetic pole module 1 provided by the embodiment of the present application, the multiple magnetic steels 21 are symmetrically arranged with respect to second center line C2 of the base plate 10, and arranged side by side in the first direction X from the second center line C2 and arranged at a predetermined angle in the second direction Y, so that the rotor forms a double inclined pole arranged inversely in the axial direction of the generator, which may effectively restrain the axial excitation while reducing the cogging torque of the generator, thus improving the stability and reliability of the permanent magnet generator.

Referring to FIG. 3 again, the multiple magnetic steels 21 of each magnetic steel component 20 are staggered in the same direction along the second direction Y, and a connecting line between a midpoint O of a cross section of each magnetic steel 21 includes a first line segment L1, a second line segment L2 and a third line segment L3 successively connected along a side of the first direction X from the second center line C2. The first line segment L1 is a line segment close to the second center line C2, the third line segment L3 is a line segment close to an edge side, the second segment L2 is a line segment between the first line segment L1 and the third line segment L3. A first included angle between the first line segment L1 and the first center line C1 is $\theta1$, a second included angle between the second line segment L2 and the first center line C1 is $\theta2$, and a third included angle between the third line segment L3 and the first center line C1 is $\theta3$. In the present application, the "cross section" of the magnetic steel refers to a shape of a surface of the magnetic steel on a surface formed by the first direction X and the second direction Y.

It should be noted that, in the present embodiment, the cross section of the magnetic steel 21 is a section sectioned along a tangential direction of the permanent magnet generator, and the midpoint O of the cross section of the magnetic steel 21 is an intersection point of two diagonals of the cross section. The second included angle $\theta2$ is an inclination angle of the designed rotor inclined pole to reduce the vibration and noise of the permanent magnet generator and improve the stability of the permanent magnet generator.

In order not to affect the normal rotation of the generator, in an embodiment, the range of the inclination angle of the inclined pole, that is, the second included angle $\theta2$ is from 1 degree to 10 degrees.

In an embodiment, the second included angle $\theta2$ meets the following conditions with the third included angle $\theta3$ and the first included angle $\theta1$: $\theta1<\theta2$, $\theta3<\theta2$, so as to avoid interference between two adjacent magnetic pole modules 1 installed on the rotor support of the permanent magnet generator. The first included angle $\theta1$ may be greater than the third included angle $\theta3$, or less than or equal to the third included angle $\theta3$, which will not be discussed in detail.

In an embodiment, the first included angle $\theta1$, the second included angle $\theta2$ and the third included angle $\theta3$ are equal in size to simplify the structural design of the magnetic pole module 1. In addition, in order not to affect the normal rotation of the generator, in an embodiment, the ranges of the first included angle $\theta1$, the second included angle $\theta2$ and the third included angle $\theta3$ are all from 1 degree to 10 degrees.

For ease of description, the situation that the first included angle $\theta1$, the second included angle $\theta2$ and the third included angle $\theta3$ meet the following conditions: $\theta1<\theta2$, $\theta3<\theta2$ is taken as an example in the present embodiment for illustration.

The base plate 10 may be formed by soft magnetic materials with good magnetic conductivity through machining, such as low carbon steel, silicon steel, electric iron and the like. The magnetic steel 21 may be made of hard magnetic materials such as neodymium iron boron permanent magnetic materials, ferrite permanent magnetic materials and the like. The base plate 10 provides a magnetic path for at least a pair of magnetic steel components 20. In addition, the magnetic steel 21 may be fixed on the first surface a of the base plate 10 by a high temperature resistant fixing adhesive such as an epoxy resin adhesive or a screw connection.

Further, the magnetic steel 21 is of a parallelepiped structure, and the cross section of the magnetic steel 21 is of a parallelogram shape, which includes a pair of first sides 211 arranged oppositely and a pair of second sides 212 arranged oppositely. The first side 211 is arranged parallel to the first direction X, and the second side 212 is arranged parallel to the second direction Y or at a predetermined angle with the second direction Y.

In an embodiment, the magnetic steel 21 is of a positive parallelepiped structure, and the cross section thereof is preferably of a rectangular shape, so the midpoint O of the cross section of the magnetic steel 21 is a symmetrical center point of the cross section.

Figure 4:
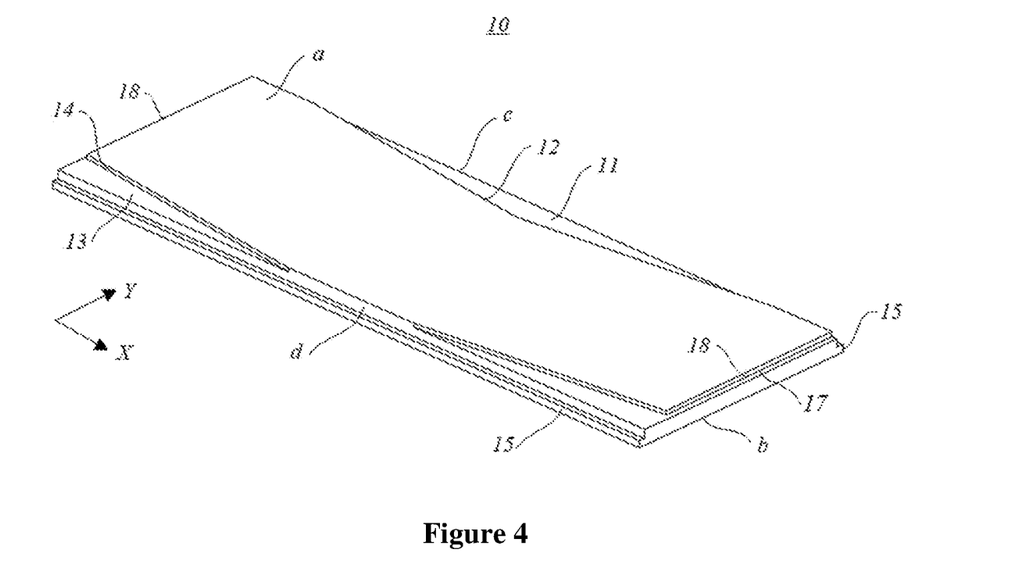
FIG. 4 is a schematic perspective view showing the structure of a base plate in the magnetic pole module shown in FIG. 2.
Figure 5:
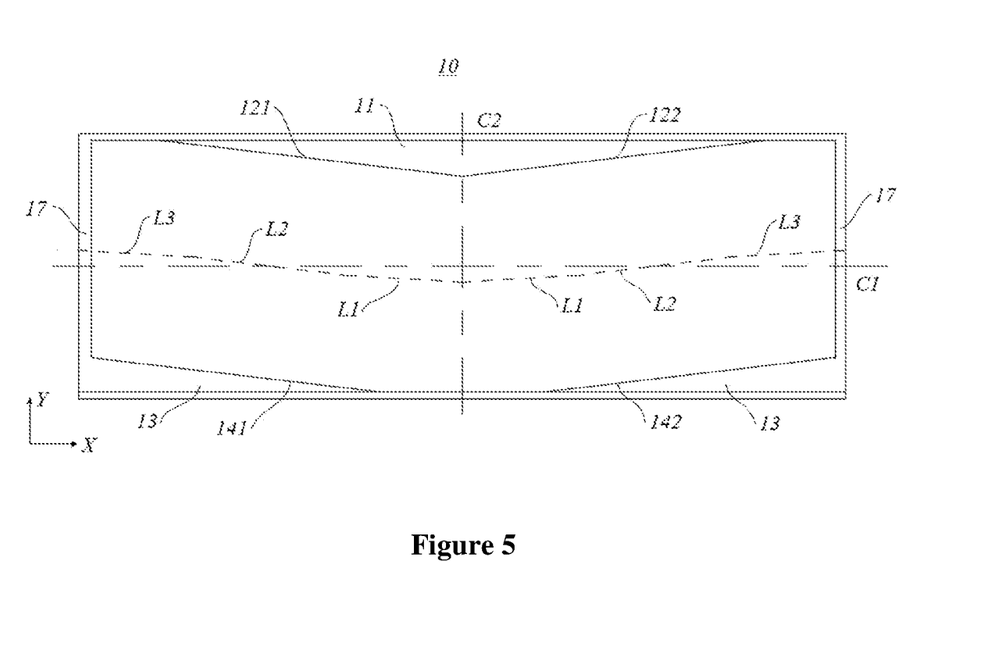
FIG. 5 is a schematic top view showing the structure of the base plate shown in FIG. 4.

Referring to FIGS. 3, 4 and 5, the base plate 10 further includes a first side wall c and a second side wall d arranged opposite to each other in the second direction Y. The first side wall c and the second side wall d are connected with the first surface a and the second surface b and extend in the first direction X. The first side wall c recesses inwards in the second direction Y to form a first tangent plane 11 and a first bottom wall 12 which are intersected with each other, the second side wall d recesses inwards in the second direction Y to form a second tangent plane 13 and a second bottom wall 14 which are intersected with each other, the first surface a is connected with the first bottom wall 12 and the second bottom wall 14, the first tangent plane 11 and the second tangent plane 13 are lower than the first surface a. In an embodiment, the first tangent plane 11 and the second tangent plane 13 are in the same plane to simplify the processing process of the base plate 10.

In an embodiment, projections of the first bottom wall 12 and the second bottom wall 14 on the first surface a are designed to be parallel to a connecting line symmetrically distributed between the first line segment L1, the second line segment L2 and the third line segment L3.

Specifically, the first bottom wall 12 includes a first half bottom wall 121 and a second half bottom wall 122 symmetrically arranged with respect to the second center line C2, and the second bottom wall 14 includes a third half bottom wall 141 and a fourth half bottom wall 142 symmetrically arranged with respect to the second center line C2.

The first side 211 of the cross section of the magnetic steel 21 includes a first endpoint 211a and a second endpoint 211b, and the other first side 211 includes a third endpoint 211c and a fourth endpoint 211d. The first endpoint 211a and the third endpoint 211c are arranged diagonally, and the second endpoint 211b and the fourth endpoint 211d are arranged diagonally.

A connecting line between the second endpoints 211b of the multiple magnetic steels 21 of any one of the pair of magnetic steel components 20 is aligned with a projection of the first half bottom wall 121 on the first surface a, and a connecting line between the fourth endpoints 211d of the multiple magnetic steels 21 is aligned with a projection of the third half bottom wall 141 on the first surface a. A connecting line between the first endpoints 211a of the multiple magnetic steels 21 of the other pair of magnetic steel components 20 is aligned with a projection of the second half bottom wall 122 on the first surface a, and a connecting line between the third endpoints 211c of the multiple magnetic steel 21 is aligned with a projection of the fourth half bottom wall 142 on the first surface a. Thus, the multiple magnetic steels 21 of a pair of magnetic steel components 20 are arranged in a "V" shape.

Further, the base plate 10 recesses inwards along two ends of the first direction X to respectively form a third tangent plane 17 and a third bottom wall 18 which are intersected with each other, the third bottom wall 18 is connected with the first surface a, and the third tangent plane 17 is lower than the first surface a. In an embodiment, the third tangent plane 17 is in the same plane with the first tangent plane 11 and the second tangent plane 13, so as to simplify the machining process of the base plate 10.

In order to prevent the moisture and corrosive medium in the external environment from infiltrating into the magnetic pole module 1 to come into contact with the magnetic steel 21, the magnetic pole module 1 further includes a protective layer (not shown in the figure).

In some embodiments, the protective layer is a protective adhesive which is applied at least on an exposed surface of the magnetic steel component 20, the first tangent plane 11, the first bottom wall 12, the second tangent plane 13, the second bottom wall 14, the third tangent plane 17 and the third bottom wall 18. The thickness of the protective adhesive shall be as small as possible on the premise of meeting the anti-corrosion requirements, so as to avoid affecting the non magnetic distance between the magnetic steel 21 and the mounting surface 2a of the rotor support 2.

In some embodiments, the protective layer is a housing which has an accommodating chamber and an opening in communication with the accommodating chamber. The first tangent plane 11, the second tangent plane 13 and the third tangent plane 17 of the base plate 10 cover the opening, so that the base plate 10 and the accommodating chamber of the housing form a closed space, and the magnetic steel component 20 is accommodated in the closed space. The housing may be made of metal materials, for example, stainless steel, to improve the protection performance of the magnetic pole module 1.

Thus, the multiple magnetic steels 21 are fixed on the first surface a of the base plate 10, and the first tangent plane 11, the second tangent plane 13 and the third tangent plane 17 are lower than the first surface a. The protective adhesive or the metal housing covers the magnetic steel component 20, and is hermetically connected with the first tangent plane 11, the first bottom wall 12, the second tangent plane 13, the second bottom wall 14, the third tangent plane 17 and the third bottom wall 18, which may reduce the magnetic flux leakage of the magnetic pole module 1.

In some embodiments, the base plate 10 of the magnetic pole module 1 includes a first base plate 101 and a second base plate 102 divided with respect to the second center line C2 in FIG. 3, in which the multiple magnetic steels 21 carried by the first base plate 101 and the multiple magnetic steels 21 carried by the second base plate 102 are symmetrically arranged to form the "V" shape.

Due to the large number of magnetic steels 21 of the magnetic pole module 1, the base plate 10 carrying multiple magnetic steels 21 is large in size along the first direction X, and the base plate 10 is complex in structure. Therefore, in the present embodiment, the base plate 10 is divided into the first base plate 101 and the second base plate 102 along the second central line C2, or divided into more base plates which are combined to form an integral magnetic pole. In this way, the processing accuracy of the base plate 10 may be improved, and then the manufacturability of the base plate 10 may be improved.

Figure 6:
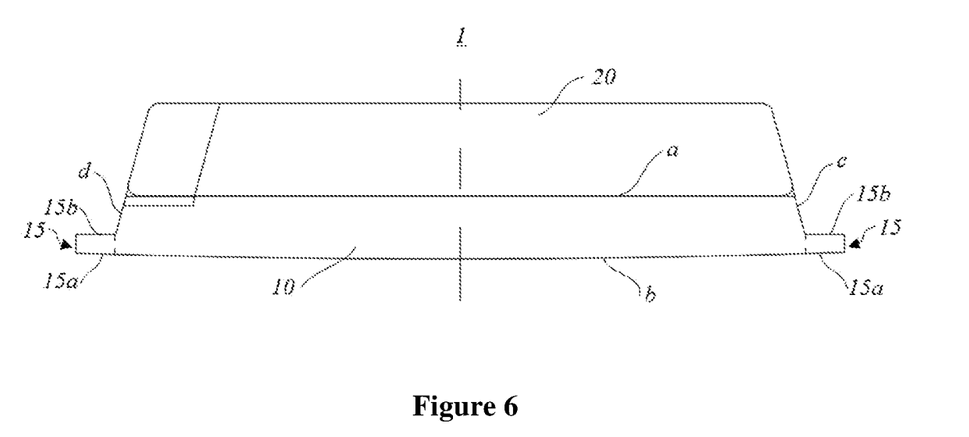
FIG. 6 is a schematic side view showing the structure of the magnetic pole module shown in FIG. 2.
Figure 7:
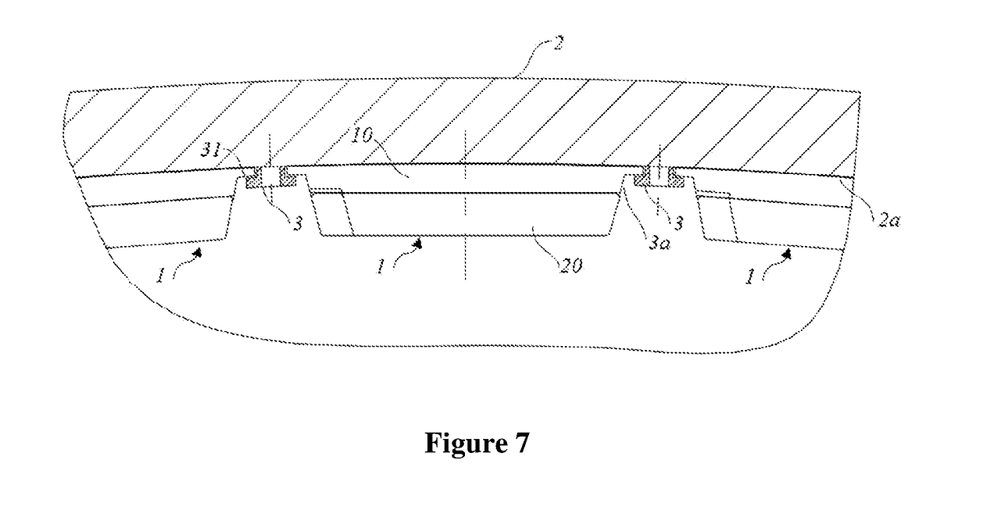
FIG. 7 is a schematic view showing the assembly effect of the magnetic pole module shown in FIG. 6 and a rotor support.

Referring to FIGS. 6 and 7, the magnetic pole module 1 is installed on the mounting rail 3a formed between every two adjacent fixing members 3 through the base plate 10.

Specifically, the first side wall c and the second side wall d of the base plate 10 respectively protrude outward in the second direction Y to form a first connection portion 15. The first connection portion 15 includes a first pressure-bearing surface 15a and a second pressure-bearing surface 15b which are arranged opposite to each other along its own thickness. The first pressure-bearing surface 15a and the second pressure-surface 15b are continuously distributed, the second pressure-bearing surface 15b is lower than the first tangent plane 11 or the second tangent plane 12, and the magnetic pole module 1 is detachably connected with the rotor support 2 through the first connection portion 15.

Specifically, multiple fixing members 3 are provided on the mounting surface 2a of the rotor support 2, and two sides of the fixing members 3 along its own width direction (that is, the circumferential direction of the rotor) protrude to form a cramping portion 31 extending in the second direction Y, and a mounting rail 3a for installing the magnetic pole module 1 is formed between every two adjacent fixing members 3. The fixing member 3 is further provided with a connection hole 33 penetrating through its own thickness (that is, a radial direction of the rotor). The fixing member 3 is fixed on the mounting surface 2a of the rotor support 2 through a fastener passing through the connection hole 33. The fixing member 3 may be made of metal materials or non-metal materials with high temperature resistance. When the fixing member 3 is made of metal materials, the fixing member 3 may also be fixed on the mounting surface 2a of the rotor support 2 by welding, which will not be described in detail.

The magnetic pole module 1 is inserted into the mounting rail 3a in the first direction X (that is, the axial direction of the rotor), and the first connection portion 15 on two sides of the base plate 10 in the second direction Y is overlapped with the cramping portion 31 on two sides of the fixing member 3 to fix the magnetic pole module 1 on the mounting surface 2a of the rotor support 2.

Figure 8:
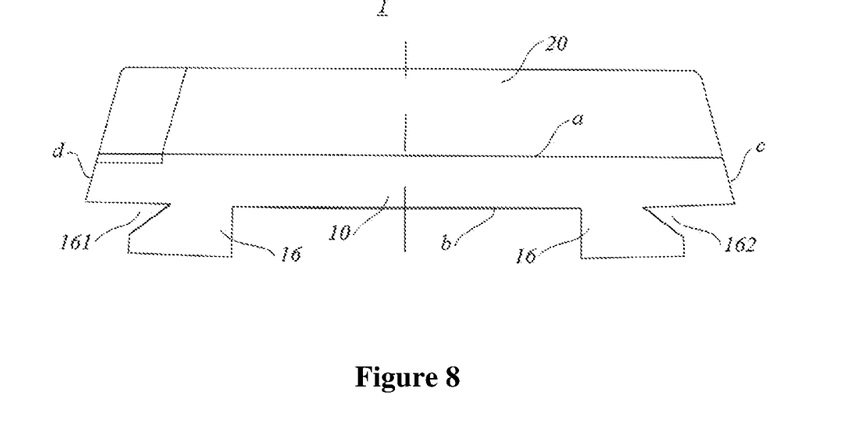
FIG. 8 is a schematic side view showing the structure of another magnetic pole module provided according to the embodiment of the present application.
Figure 9:
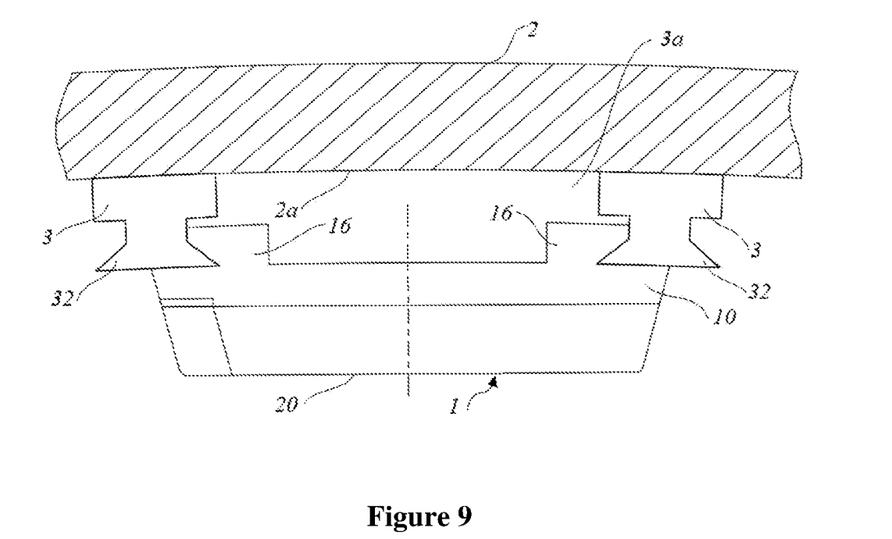
FIG. 9 is a schematic view showing the assembly of the magnetic pole module shown in FIG. 8 and the rotor support.

Referring to FIGS. 8 and 9, in some embodiments, the second surface b of the base plate 10 is provided with a second connection portion 16 formed by protruding along the direction (that is, the radial direction of the rotor) from the first surface a to the second surface b, and the magnetic pole module 1 is detachably connected with the fixing member 3 through the second connection portion 16.

Specifically, the second connection portion 16 may be arranged on two sides along the circumferential direction of the base plate 10, and the fixing member 3 has a shape which may be embedded with the second connection portion 16.

In an embodiment, one of the second connection portions 16 is provided with a first groove 161 which recesses inwards along the circumferential direction of the base plate 10, the other second connection portion 16 is provided with a second groove 162 which recesses inwards along the circumferential direction of the base plate 10, the first groove 161 and the second groove 162 are symmetrically arranged. The fixing member 3 is provided with an insertion portion 32, and the insertion portion 32 can be embedded with the first groove 161 and the second groove 162.

In some embodiments, the first groove 161 and the second groove 162 can respectively form a symmetrical half dovetail groove, and the insertion portion 32 of the fixing member 3 is matched with the dovetail groove formed by the first groove 161 and the second groove 162 of two adjacent magnetic pole modules 1.

In some embodiments, the first groove 161 and the second groove 162 can further respectively form a symmetrical half T-shaped groove, and the insertion portion 32 of the fixing member 3 is matched with the T-shaped groove formed by the first groove 161 and the second groove 162 of two adjacent magnetic pole modules 1.

It is conceivable that the first groove 161 and the second groove 162 may also be other forms of grooves, as long as it is matched with the insertion portion 32 of the fixing member 3, which will not be repeated.

It is conceivable that the detachable connection mode between the second connection portion 16 of the base plate 10 and the fixing member 3 is not limited to the above embodiments. For example, one of the second connection portions 16 may also be a first insertion portion protruding outwards along the circumferential direction of the base plate 10, the other second connection portion 16 is a second insertion portion protruding outwards along the circumferential direction of the base plate 10, and the fixing member 3 is correspondingly provided with a groove portion which is matched with the first insertion portion and the second insertion portion, which will not be described in detail.

Figure 10:
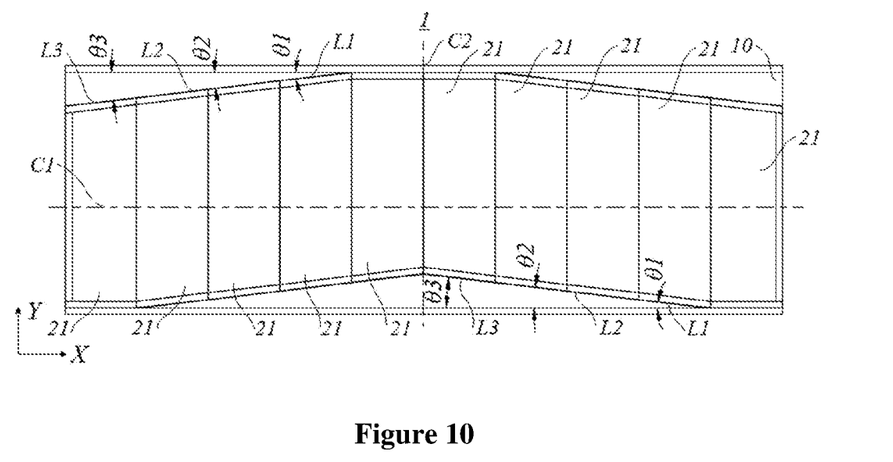
FIG. 10 is a schematic top view showing the structure of another integral magnetic pole module provided according to the embodiment of the present application.

Referring to FIG. 10, another magnetic pole module 1 is further provided according to the embodiment of the present application, which is similar to the magnetic pole module 1 shown in FIG. 2 in structure. The difference is that the edges of multiple magnetic steels 21 of each magnetic steel component 20 are tilted in the second direction Y, and an edge connecting line of multiple magnetic steels 21 includes the first line segment L1, the second line segment L2 and the third line segment L3 successively connected along a side of the first direction X from the second center line C2. The first line segment L1 is a line segment close to the edge on two sides, the third line segment L3 is a line segment close to the second center line C2, and the second line segment L2 is a line segment between the first line segment L1 and the third line segment L3. The first included angle between the first line segment L1 and the first center line C1 is $\theta 1$, the second included angle between the second line segment L2 and the first center line C1 is $\theta 2$, and the third included angle between the third line segment L3 and the first center line C1 is $\theta 3$. The values of the first included angle $\theta 1$, the second included angle $\theta 2$ and the third included angle $\theta 3$ may be the same or different depending on the specific machining and a magnetic pole torque.

In an embodiment, the second included angle $\theta 2$ with the third included angle $\theta 3$ and the first included angle $\theta 1$ meets the following condition: $\theta 1 < \theta 2$, $\theta 3 < \theta 2$, so as to avoid interference between two adjacent magnetic pole modules 1 installed on the rotor support of the permanent magnet generator. The first included angle $\theta 1$ may be greater than the third included angle $\theta 3$, or less than or equal to the third included angle $\theta 3$, which will not be discussed in detail.

In order to reduce the cogging torque of the motor optimally, in an embodiment, the range of the inclination angle of the inclined pole, that is, the second included angle $\theta 2$, is from 1 degree to 10 degrees.

In an embodiment, the cross section of the magnetic steel 21 is of a parallelogram and/or trapezoid shape.

Specifically, the edges of multiple magnetic steels 21 of each magnetic steel component 20 are tilted in the second direction Y, and the cross section of a part of magnetic steels 21 is of a parallelogram shape, and the cross section of another part of magnetic steels 21 is of a trapezoid shape. In the embodiment shown in FIGS. 2 and 10, each magnetic steel component 20 includes five magnetic steels 21 arranged on the base plate 10, and the cross sections of the magnetic steels 21 located in the middle and an end of the base plate 10 are of a right angle trapezoid shape, and the planes, where the right angle sides of the two magnetic steels 21 are arranged, are opposite to each other, and the cross sections of the other three magnetic steels 21 each are of a parallelogram shape.

Thus, a pair of magnetic steel components 20 are symmetrically arranged on the base plate 10 with respect to the second center line C2, forming a "V" shape. The multiple magnetic steels 21 of each pair of magnetic steel components 20 form a double inclined pole arranged inversely along the axial direction, so as to reduce the cogging torque. At the same time, the multiple magnetic steels 21 of each pair of magnetic steel components 20 may, in addition to generate the tangential excitation that drives the generator to rotate, further generate the additional axial excitation in an opposite direction, which just offsets each other along the axial direction of the generator rotor, thus eliminating the adverse effect of the additional axial excitation caused by the rotor inclined pole arrangement.

Figure 11:
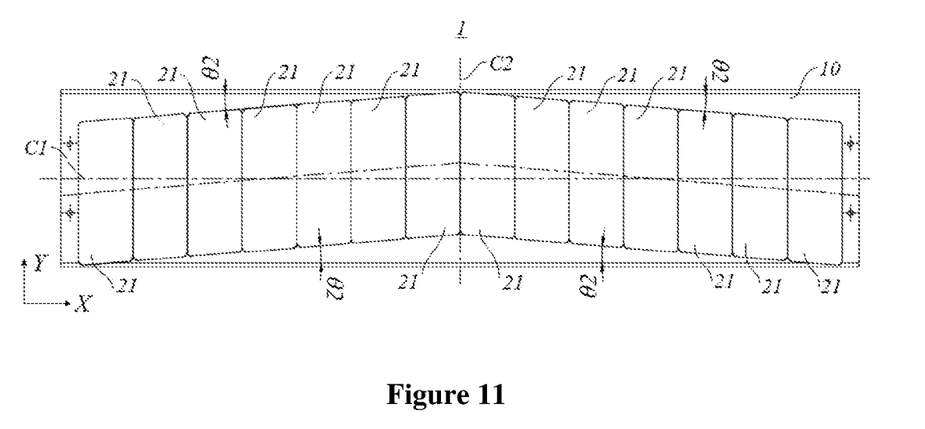
FIG. 11 is a schematic top view showing the structure of another integral magnetic pole module provided according to the embodiment of the present application.

Referring to FIG. 11, another magnetic pole module 1 is further provided according to the embodiment of the present application, which is similar to the structure of the magnetic pole module 1 shown in FIG. 10. The difference is that the edge connecting line of the multiple magnetic steels 21 of each magnetic steel component 20 includes the first line segment L1, the second line segment L2 and the third line segment L3 successively connected along the side of the first direction X from the second central line C2. The first included angle between the first line segment L1 and the first center line C1 is θ1, the second included angle between the second line segment L2 and the first center line C1 is θ2, and the third included angle between the third line segment L3 and the first center line C1 is θ3, and the first included angle θ1, the second included angle θ2 and the third included angle θ3 are equal in size.

In order to reduce the cogging torque of the motor optimally, in an embodiment, the range of the inclination angle of the inclined pole, that is, the second included angle θ2, is from 1 degree to 10 degrees.

In an embodiment, the cross section of the magnetic steel 21 is of a parallelogram shape.

Specifically, the cross sections of the multiple magnetic steels 21 of each magnetic steel component 20 are of a parallelogram shape. As shown in FIGS. 2 and 11, each magnetic steel component 20 includes seven magnetic steels 21 arranged on the base plate 10, the cross section of each magnetic steel 21 is of a parallelogram shape, and the included angle between the edge connecting line of the multiple magnetic steels 21 and the first center line C1 is θ2.

Thus, a pair of magnetic steel components 20 are symmetrically arranged on the base plate 10 with respect to the second center line C2, forming a "V" shape. The multiple magnetic steels 21 of each pair of magnetic steel components 20 form the double inclined pole arranged inversely along the axial direction, so as to reduce the cogging torque. At the same time, the multiple magnetic steels 21 of each pair of magnetic steel components 20 may, in addition to generate the tangential excitation that drives the generator to rotate, further generate the additional axial excitation in an opposite direction, which just offsets each other along the axial direction of the generator rotor, thus eliminating the adverse effect of the additional axial excitation caused by the rotor inclined pole arrangement.

Figure 12:
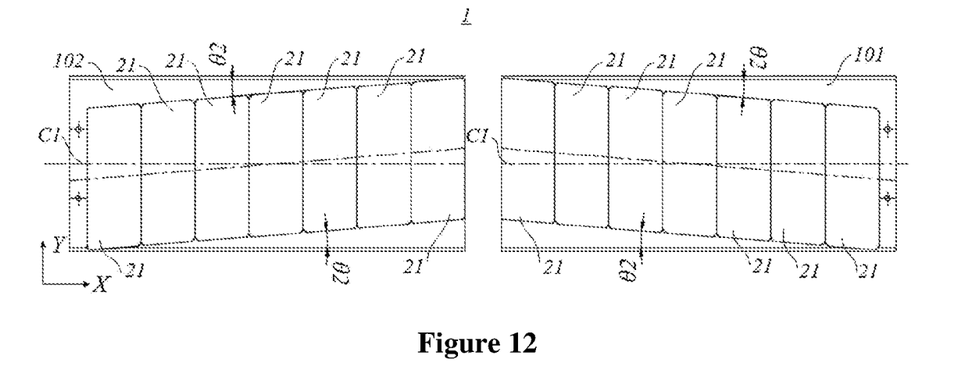
FIG. 12 is a schematic top view showing the structure of another integral magnetic pole module provided according to the embodiment of the present application.

Referring to FIG. 12, another magnetic pole module 1 is further provided according to the embodiment of the present application, which is similar to the structure of the magnetic pole module 1 shown in FIGS. 2 to 11, and the difference is that each magnetic pole module 1 includes the base plate 10 and the magnetic steel component 20 fixed on the base plate 10, and the magnetic steel component 20 includes the multiple magnetic steels 21 arranged side by side in the first direction X and/or arranged at a first predetermined angle and/or a second predetermined angle in the second direction Y. The first predetermined angle and the second predetermined angle are equal in size and opposite in direction.

Therefore, in the present embodiment, in the multiple magnetic pole modules 1 forming a column of integral magnetic pole modules, the multiple magnetic steels 21 of the base plate 10 of a part of the magnetic pole module 1 are arranged side by side in the first direction X and arranged at the first predetermined angle in the second direction Y; the multiple magnetic steels 21 of the base plate 10 of another part of the magnetic pole module 1 are arranged side by side in the first direction X and arranged at the second predetermined angle in the second direction Y. In addition, the multiple magnetic steels 21 of the base plate 10 of another part of the magnetic pole module 1 are arranged side by side in the first direction X and arranged at the first predetermined angle and the second predetermined angle in the second direction Y, so that the multiple magnetic steels 21 of the multiple magnetic pole modules 1 in a column of integral magnetic pole modules form at least one "V" shape in the first direction X. In other words, the multiple base plates 10 in the present embodiment may be spliced into a complete base plate 10 in the magnetic pole module 1 shown in FIGS. 2 to 11 in the first direction X.

Due to the large number of magnetic steels 21 of the magnetic pole module 1 shown in FIGS. 2 to 11, the base plate 10 carrying multiple magnetic steels 21 in the first direction X is large in size, and the base plate 10 is complex in structure, which is difficult to ensure the machining accuracy of the base plate 10, and the manufacturing is difficult. The machining accuracy of the base plate 10 may be improved and the manufacturability of the base plate 10 may be improved by segmentally arranging the larger base plate 10 onto at least two smaller base plates 10 in the first direction X.

Two magnetic pole modules 1 may be spliced into a column of integral magnetic pole modules in the first direction X, which is taken as an example for illustration.

As shown in FIG. 12, in two magnetic pole modules 1, one of the magnetic pole modules 1 includes the first base plate 101 and the magnetic steel component 20 fixed on the first base plate 101, and the magnetic steel component 20 includes multiple magnetic steels 21 arranged side by side in the first direction X and arranged at the first predetermined angle in the second direction Y. The other magnetic pole module 1 includes the second base plate 102 and the magnetic steel component 20 fixed on the second base plate 102. The magnetic steel component 20 includes multiple magnetic steels 21 arranged side by side in the first direction X and arranged at the second predetermined angle in the second direction Y. The multiple magnetic steels 21 of the two magnetic pole modules 1 may form a "V" shape in the first direction X, and the first base plate 101 and the second base plate 102 may be spliced into the base plate 10 in the magnetic pole module 1 shown in FIGS. 2 to 11 in the first direction X.

It is conceivable that if a column of integral magnetic pole modules is divided into more magnetic pole modules 1 in the first direction X. For example, three magnetic pole modules 1, that is, in addition to the aforementioned magnetic pole module including the first base plate 101 and the magnetic pole module including the second base plate 102, it further includes a magnetic pole module located between the two magnetic pole modules, and the magnetic steel component 20 on a third base plate of the magnetic pole module includes multiple magnetic steels 21 arranged side by side in the first direction X and arranged at the first predetermined angle and the second predetermined angle in the second direction Y, that is, the multiple magnetic steels 21 are arranged on the third base plate in a small "V" shape. Thus, the base plate 10 of a column of complete integral magnetic pole modules may be divided into the first base plate 101, the second base plate 102 and the third base plate in a small size in the first direction X, which is easy to machine and manufacture.

Thus, in a column of magnetic pole modules, the multiple magnetic steels 21 of the multiple magnetic pole modules 1 form the double inclined pole arranged inversely along the axial direction to reduce the cogging torque. At the same time, the multiple magnetic steels 21 of each pair of magnetic steel components 20 may, in addition to generate the tangential excitation that drives the generator to rotate, further generate the additional axial excitation in an opposite direction, which just offsets each other along the axial direction of the generator rotor, thus eliminating the adverse effect of the additional axial excitation caused by the rotor inclined pole arrangement.

It should be noted that, although the generator with the external-rotor structure is described as an example for ease of description, it is conceivable that, the rotor according to the exemplary embodiments of the present application is also applicable to generators with an internal-stator structure.

In addition, the magnetic pole module and the generator according to the exemplary embodiments described above may be applied to various devices that require setting a generator, such as but not limited to a wind turbine.

Those skilled in the art should understand that the above embodiments are exemplary rather than restrictive. Different technical features that appear in different embodiments may be combined to achieve beneficial effects. Other variations to the disclosed embodiments may be understood and effected by the person skilled in the art upon studying the drawings, the specification, and the claims. In the claims, the term "comprise" does not exclude other devices or steps, the indefinite article "a/an" does not exclude a plurality; when the good is not modified with quantifier, it aims to include one or more goods and can be used interchangeably with "one or more goods"; and the terms "first" and "second" are used to indicate names rather than any particular order. Any reference numerals in the claims should not be construed as a limitation of the protection scope of the present application. The functions of various parts appearing the claims can be implemented by a single hardware or software module. The presence of certain technical features in different subordinate claims does not mean that these technical features cannot be combined to achieve beneficial effects.

The invention claimed is:

1. A magnetic pole module, installed on a rotor support of a permanent magnetic generator, wherein, the magnetic pole module comprises:
   a base plate, having a first surface and a second surface arranged opposite to each other along a thickness direction of the base plate, wherein, the base plate has a first center line extending in a first direction and a second center line extending in a second direction, and the first direction is intersected with the second direction, the first center line is parallel to a central axis of the permanent magnet generator;
   at least one pair of magnetic steel components, fixed on the base plate, wherein, each pair of magnetic steel components is symmetrically arranged on the first surface relative to the second center line, each magnetic steel component comprises a plurality of magnetic steels arranged side by side in a side of the first direction from the second center line and at a predetermined angle in the second direction,
   wherein, a plurality of magnetic steels of each magnetic steel component is successively staggered in a same direction in the second direction, and a connecting line between a midpoint of a cross section of each magnetic steel includes a first line segment, a second line segment and a third line segment successively connected in a side of the first direction from the second central line,
   a first included angle between the first line segment and the first center line is θ1, a second included angle between the second line segment and the first center line is θ2, and a third included angle between the third line segment and the first center line is θ3,
   wherein, a cross section of the magnetic steel is of a rectangular shape, which comprises a pair of first sides arranged oppositely and a pair of second sides arranged oppositely, the pair of first sides is parallel to the first direction, the pair of second sides is parallel to the second direction or is arranged at the predetermined angle with the second direction,
   wherein, the base plate further comprises a first side wall and a second side wall which are arranged opposite to each other in the second direction, the first side wall and the second side wall are connected with the first surface and the second surface and extend in the first direction, and the first side wall recesses inwards in the second direction to form a first tangent plane and a first bottom wall which are intersected with each other, the second side wall recesses inwards in the second direction to form a second tangent plane and a second bottom wall which are intersected with each other, the first surface is connected with the first bottom wall and the second bottom wall, and the first tangent plane and the second tangent plane are lower than the first surface.

2. The magnetic pole module according to claim 1, wherein,
   edges of the plurality of magnetic steels of each magnetic steel component are tilted in the second direction, and a connecting line between the edges of the plurality of magnetic steels includes a first line segment, a second line segment and a third line segment successively connected in a side of the first direction from the second center line,
   a first included angle between the first line segment and the first center line is θ1, a second included angle between the second line segment and the first center line is θ2, and a third included angle between the third line segment and the first center line is θ3.

3. The magnetic pole module according to claim 2, wherein a cross section of the magnetic steel is of a parallelogram and/or trapezoid shape.

4. The magnetic pole module according to claim 3, wherein, the base plate further comprises a first side wall and a second side wall which are arranged opposite to each other in the second direction, the first side wall and the second side wall are connected with the first surface and the second surface and extend in the first direction, and the first side wall recesses inwards in the second direction to form a first tangent plane and a first bottom wall which are intersected with each other, the second side wall recesses inwards in the second direction to form a second tangent plane and a second bottom wall which are intersected with each other, the first surface is connected with the first bottom wall and the second bottom wall, and the first tangent plane and the second tangent plane are lower than the first surface.

5. The magnetic pole module according to claim 2, wherein the second included angle θ2 with the third included angle θ3 and the first included angle θ1 meets the following condition: θ1<θ2, θ3<θ2.

6. The magnetic pole module according to claim 2, wherein the first included angle θ1, the second included angle θ2 and the third included angle θ3 are equal in size.

7. The magnetic pole module according to claim 2, wherein a range of the second included angle θ2 is from 1 degree to 10 degrees.

8. The magnetic pole module according to claim 1, wherein the second included angle θ2 with the third included angle θ3 and the first included angle θ1 meets the following condition: θ1<θ2, θ3<θ2.

9. The magnetic pole module according to claim 1, wherein the first included angle θ1, the second included angle θ2 and the third included angle θ3 are equal in size.

10. The magnetic pole module according to claim 1, wherein a range of the second included angle θ2 is from 1 degree to 10 degrees.

11. The magnetic pole module according to claim 1, wherein a projection of the first bottom wall and the second bottom wall on the first surface is arranged as a connecting line parallel to the first line segment, the second line segment and the third line segment which are symmetrically connected.

12. The magnetic pole module according to claim 1, wherein, two ends of the base plate in the first direction respectively recesses inwards to form a third tangent plane and a third bottom wall which are intersected with each other, the third bottom wall is connected with the first surface, and the third tangent plane is lower than the first surface.

13. The magnetic pole module according to claim 12, wherein, the magnetic pole module further comprises a protective adhesive which is at least applied on an exposed surface of the magnetic steel component, the first tangent plane, the first bottom wall, the second tangent plane, the second bottom wall, the third tangent plane and the third bottom wall;
or, the magnetic pole module further comprises a housing having an accommodating chamber and an opening in communication with the accommodating chamber, and the first tangent plane, the second tangent plane and the third tangent plane of the base plate cover the opening, which allows the base plate and the accommodating chamber of the housing to form a closed space, and the magnetic steel component is accommodated in the closed space.

14. The magnetic pole module according to claim 1, wherein, the first side wall and the second side wall of the base plate respectively protrude outwards in the second direction to form a first connection portion, the first connection portion comprises a first pressure-bearing surface and a second pressure-bearing surface which are arranged opposite to each other along a thickness of the first connection portion, the first pressure-bearing surface and the second pressure-bearing surface are continuously arranged, and the second pressure-bearing surface is lower than the first tangent plane or the second tangent plane;
or, the second surface of the base plate protruding in a direction from the first surface to the second surface forms a second connection portion;
the magnetic pole module is detachably connected with the rotor support through the first connection portion or the second connection portion.

15. A rotor for a permanent magnet generator, comprising:
a rotor support having a mounting surface;
a plurality of fixing members distributed spaced apart on the mounting surface along a circumferential direction of the rotor support, wherein, a mounting rail is formed between every two adjacent fixing members;
a plurality of magnetic pole modules according to claim 1, wherein the magnetic pole module is installed on the mounting rail in the first direction.

16. A magnetic pole module, installed on a rotor support of a permanent magnet generator, wherein, the magnetic pole module comprises:
a base plate, having a first surface and a second surface arranged opposite to each other along a thickness direction of the base plate, and, the base plate has a first center line extending in a first direction, and the first center line is parallel to a central axis of the permanent magnet generator;
a magnetic steel component fixed on the base plate, and, the magnetic steel component comprises a plurality of magnetic steels which are arranged side by side in the first direction and arranged at a first predetermined angle and/or a second predetermined angle in the second direction, and, the first direction is intersected with the second direction, and the first predetermined angle and the second predetermined angle are equal in size and opposite in direction,
wherein, a plurality of magnetic steels of each magnetic steel component is successively staggered in a same direction in the second direction, and a connecting line between a midpoint of a cross section of each magnetic steel includes a first line segment, a second line segment and a third line segment successively connected in a side of the first direction from the second central line,
a first included angle between the first line segment and the first center line is θ1, a second included angle between the second line segment and the first center line is θ2, and a third included angle between the third line segment and the first center line is θ3,
wherein, a cross section of the magnetic steel is of a rectangular shape, which comprises a pair of first sides arranged oppositely and a pair of second sides arranged oppositely, the pair of first sides is parallel to the first direction, the pair of second sides is parallel to the second direction or is arranged at the predetermined angle with the second direction,
wherein, the base plate further comprises a first side wall and a second side wall which are arranged opposite to each other in the second direction, the first side wall and the second side wall are connected with the first surface and the second surface and extend in the first direction, and the first side wall recesses inwards in the second direction to form a first tangent plane and a first bottom wall which are intersected with each other, the second side wall recesses inwards in the second direction to form a second tangent plane and a second bottom wall which are intersected with each other, the first surface is connected with the first bottom wall and the second bottom wall, and the first tangent plane and the second tangent plane are lower than the first surface.

* * * * *